(12) United States Patent
Campbell et al.

(10) Patent No.: US 6,992,823 B2
(45) Date of Patent: Jan. 31, 2006

(54) CHROMATIC DISPERSION COMPENSATOR

(75) Inventors: Scott P. Campbell, Thousand Oaks, CA (US); Pochi A. Yeh, Thousand Oaks, CA (US)

(73) Assignee: Oplink Communications, Inc., Fremont, CA (US)

( * ) Notice: Subject to any disclaimer, the term of this patent is extended or adjusted under 35 U.S.C. 154(b) by 98 days.

(21) Appl. No.: 10/600,415

(22) Filed: Jun. 20, 2003

(65) Prior Publication Data

US 2004/0004764 A1 Jan. 8, 2004

Related U.S. Application Data

(60) Provisional application No. 60/390,915, filed on Jun. 24, 2002.

(51) Int. Cl.
*G02B 5/30* (2006.01)
*G02B 27/28* (2006.01)

(52) U.S. Cl. .................. 359/495; 359/900; 398/53; 398/81

(58) Field of Classification Search .......... 359/487, 359/495, 497, 900; 398/53, 81, 147, 149, 398/159, 161
See application file for complete search history.

(56) References Cited

U.S. PATENT DOCUMENTS

| | | | | |
|---|---|---|---|---|
| 4,784,490 A | * | 11/1988 | Wayne | 356/487 |
| 6,169,626 B1 | * | 1/2001 | Chen et al. | 359/279 |
| 6,243,200 B1 | * | 6/2001 | Zhou et al. | 359/497 |
| 6,252,716 B1 | * | 6/2001 | Paiam | 359/618 |
| 6,301,046 B1 | * | 10/2001 | Tai et al. | 359/498 |
| 6,342,968 B1 | * | 1/2002 | Tai et al. | 359/494 |
| 6,519,065 B1 | * | 2/2003 | Colbourne et al. | 398/81 |
| 6,570,711 B2 | * | 5/2003 | Ducellier | 359/629 |
| 6,683,721 B2 | * | 1/2004 | Copner et al. | 359/618 |
| 6,757,066 B2 | * | 6/2004 | Hill | 356/493 |
| 6,804,467 B2 | * | 10/2004 | Colbourne et al. | 398/159 |

* cited by examiner

*Primary Examiner*—Ricky D. Shafer
(74) *Attorney, Agent, or Firm*—Scot A. Reader, Esq.

(57) ABSTRACT

A chromatic dispersion compensator comprises a beam delay element, such as one or more Gires-Tournois etalon (GTEs); a beam director, such as a polarizing beam splitter (PBS), a prism polarizer, a dielectric polarizer or a crystal polarizer; and a polarization changer, such as one or more quarter-wave plates. The beam director directs an inbound optical beam based on its polarization toward the beam delay element whereat a first unit of group delay is induced. The optical beam traverses the beam delay element and enters a polarization changer whereat the optical beam obtains a new polarization. The optical beam traverses the polarization changer and re-enters the beam director whereupon a path change is induced on the optical beam based on its new polarization and the optical beam is redirected toward the beam delay element whereat a second unit of group delay is induced. The compensator is arranged to advantageously perform the referenced technique contemporaneously on two constituent optical beams (having different polarizations) of an inbound optical beam and eventually re-combine the two constituent optical beams into an outbound optical beam. The beam delay element may include one or more GTEs. Inducement of path changes and direction of the optical beam to the beam delay element may be assisted by one or more ninety degree mirrors. The referenced technique may be performed on an optical beam more than twice, such that a third, fourth, fifth, etc. delay is induced on the optical beam.

12 Claims, 4 Drawing Sheets

CHROMATIC DISPERSION COMPENSATOR

CROSS-REFERENCE OF RELATED APPLICATION(S)

This application claims the benefit of U.S. provisional application No. 60/390,915, filed on Jun. 24, 2002, the contents of which are incorporated herein by reference.

BACKGROUND OF THE INVENTION

The wavelength dependence of the group velocity of light propagating in an optical fiber leads to pulse distortion. Wavelength-dependent pulse distortion is commonly called group chromatic dispersion (CD) and can lead to high bit error rates or even signal loss if left uncorrected. The problem becomes particularly severe at high data rates and over long transmission distances. In the conventional approach to CD correction, a pulse is detected after a short transmission distance, reshaped in the electronic domain, and retransmitted. For Dense Wave Division Multiplexing (DWDM) systems, reshaping in the electronic domain is too costly.

It is known that CD can be corrected in the optical domain using a dispersion compensator which provides compensating dispersion. For example, a Gires-Tournois etalon (GTE) can provide periodic compensating dispersion at frequencies aligned to the International Telecommunications Union (ITU) transmission channel grids.

A GTE consists of a partially reflecting mirror at the input face and a totally reflecting mirror at the rear. These two mirrors are parallel and separated by a distance in between. As a result of the cavity between the mirrors, the wavelength-dependent phase shift a beam experiences upon interaction with a GTE can be written $$\phi = 2\tan^{-1}\left(\frac{1+\sqrt{R}}{1-\sqrt{R}}\tan\left(\frac{\omega}{c}nd\right)\right) \quad (1)$$

where R is the mirror reflectivity of the front mirror, n is the index of refraction of the cavity medium and d is the space between the mirrors. Notice that the phase shift depends on the frequency of light $\omega$.

The compensating group delay can be obtained by taking a derivative of the phase shift with respect to the frequency $\omega$. This leads to $$\tau = \frac{d\phi}{d\omega} = \frac{\sigma}{1+(\sigma^2-1)\sin^2(\omega nd/c)}\tau_0 \quad (2)$$

where $$\sigma = \frac{1+\sqrt{R}}{1-\sqrt{R}} \quad (3)$$

and $$\tau_0 = \frac{d}{d\omega}\left(2\frac{\omega}{c}nd\right) = \frac{2d}{v_g} \quad (4)$$

Here, $\tau_0$ is the round trip flight time inside the cavity; $v_g$ is the group velocity of light inside the cavity medium. For a vacuum cavity, $v_g$ is c, for a non-vacuum cavity, $v_g$ is c/n.

The compensating CD (in units of ps/nm) is defined as the derivative of the group delay $\Gamma$ with respect to wavelength $\lambda$, that is $$CD = \frac{d\tau}{d\lambda} = -\frac{2\pi c}{\lambda^2}\frac{d\tau}{d\omega} \quad (5)$$

The amount of compensating dispersion provided by a single GTE interaction has generally been inadequate for long distance broadband applications. Multiple GTE arrangements—for example, dual GTEs separated by a zig-zag beam path—have achieved a higher amount of compensating dispersion. However, known multiple GTE arrangements have experienced problems of beam walk-off due to the oblique incidence of the beam's arrival at the GTEs. As well, multiple GTE interactions are needed in order to increase the bandwidth of the periodic CD function required for CD compensation.

In summary, to adequately correct CD in long distance, broadband applications, multiple GTE interactions are needed. However, to avoid beam walk-off, the beam must arrive at substantially normal incidence for each of the multiple GTE interactions.

SUMMARY OF THE INVENTION

The present invention, in a basic feature, provides a chromatic dispersion compensator comprising a beam delay element, such as one or more GTEs; a beam director, such as a polarizing beam splitter (PBS), a prism polarizer, a dielectric polarizer or a crystal polarizer; and a polarization changer, such as one or more quarter-wave plates. The beam director directs an inbound optical beam based on its polarization toward the beam delay element whereat a first unit of group delay is induced. The optical beam traverses the beam delay element and enters a polarization changer whereat the optical beam obtains a new polarization. The optical beam traverses the polarization changer and re-enters the beam director whereupon a path change is induced on the optical beam based on its new polarization and the optical beam is redirected toward the beam delay element whereat a second unit of group delay is induced. The compensator is arranged to advantageously perform the referenced technique contemporaneously on two constituent optical beams (having different polarizations) of an inbound optical beam and eventually recombine the two constituent optical beams into an outbound optical beam. The beam delay element may include one or more GTEs. Inducement of path changes and direction of the optical beam to the beam delay element may be assisted by one or more prismatic mirrors. Naturally, the referenced technique may be performed on an optical beam more than twice, such that a third, fourth, fifth, etc. delay is induced on the optical beam.

The present invention, in another feature, provides a method for chromatic dispersion compensation which comprises directing based on a first polarization an optical beam to a delay element, inducing a first unit of group delay on the optical beam at the delay element, changing the polarization of the optical beam from the first polarization to a second polarization, inducing a path change on the optical beam based on the second polarization, redirecting the optical beam to the delay element and inducing a second unit of group delay on the optical beam at the delay element.

These and other features of the invention will be better understood by reference to the detailed description of the preferred embodiment, taken in conjunction with the drawings which are briefly described below. Of course, the invention is defined by the appended claims.

DETAILED DESCRIPTION OF THE PREFERRED EMBODIMENT

Figure 1:
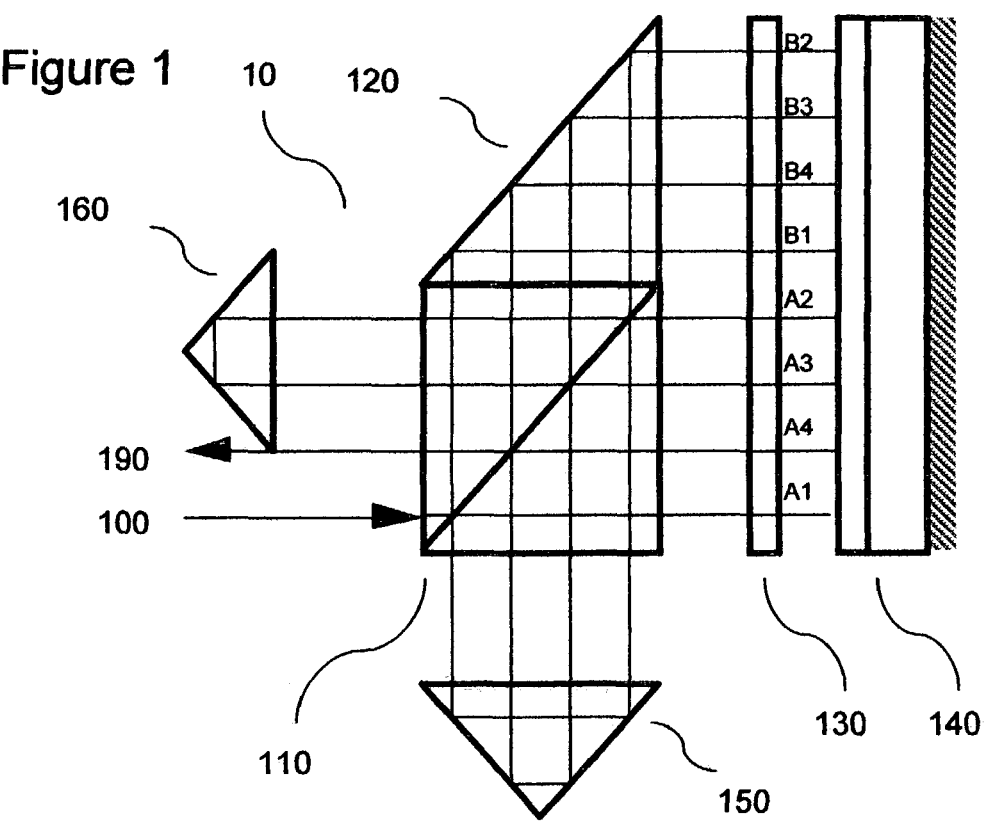
FIG. 1 shows a chromatic dispersion compensator having one PBS, one quarter-wave plate, one GTE and three ninety degree mirrors, in accordance with a first embodiment of the invention.

In FIG. 1, a chromatic dispersion compensator 10 in accordance with a first embodiment of the invention is shown. Compensator 10 includes a PBS 110, a first ninety degree mirror 120, a quarter-wave plate 130, a GTE 140, a second ninety degree mirror 150 and a third ninety degree mirror 160.

PBS 110 is made from two right angle glass prisms joined at the hypotenuse. The hypotenuse face of one prism has a dielectric coating so as to make PBS 110 reactive to the polarization of light. That Is, light is either transmitted or reflected at the hypotenuse of PBS 110 depending on its polarization.

First ninety degree mirror 120 is a right angle glass prism whose hypotenuse is fully reflective.

Quarter-wave plate 130 is a birefringent crystal which converts linearly polarized light into circularly polarized light and vice versa. When quarter-wave plate 130 is double-passed, it acts as a half-wave plate and rotates the plane of polarization of light.

GTE 140 has a first mirror which is partially reflective, a second mirror which is fully reflective and a cavity in between. The spacing between the mirrors (i.e. the thickness of the cavity) is generally a function of the channel spacing of a DWDM system in which compensator 10 is operative. Light arriving from PBS 110 or prismatic mirror 120 enters and exits GTE 140 through the partially reflective mirror. GTE 140 subjects different wavelength components of the light to variable delay in accordance with its resonant properties. That is, the partial reflectivity of the first mirror causes certain wavelength components to be restrained in the cavity between the first mirror and the second mirror longer than others. GTE 140 thereby imposes a group delay on the wavelength components of the light which, when implemented over multiple instances, i.e. multiple bounces, can correct CD previously induced on the light's pulses by a high speed, long haul, DWDM transmission system.

Second ninety degree mirror 150 is a right angle glass prism whose shortest two legs are fully reflective.

Third ninety degree mirror 160 is a right angle glass prism whose shortest two legs are fully reflective.

In operation, an input optical beam 100, which is unpolarized, is incident into PBS 110. PBS 110 splits beam 100 into two polarized beams A1, B1. Polarized beams A1, B1 are directed (with the help of mirror 120 in the case of beam B1) toward GTE 140 at normal incidence via quarter-wave plate 130. GTE 140 contributes a first unit of group delay on polarized beams A1, B1. Upon reflecting from GTE 140 and passing through quarter-wave plate 130 a second time on the return trip, the polarization plane of beams A1, B1 is rotated. Thus, when the beams A1, B1 re-intersect at PBS 110, they are recombined into an unpolarized beam and directed to mirror 150. This completes the first cycle.

Prismatic mirror 150 redirects the unpolarized beam toward PBS 110, beginning a second cycle in which GTE 140 contributes a second unit of group delay on polarized beams A2, B2. Upon reflecting from GTE 140 and double passing through quarter-wave plate 130, the polarization plane of beams A2, B2 is once again rotated. Thus, when the beams A2, B2 re-intersect at PBS 110, they are recombined into an unpolarized beam and directed to mirror 160. This completes the second cycle.

Mirror 160 redirects the unpolarized beam toward PBS 110, beginning a third cycle in which GTE 140 contributes a third unit of group delay on polarized beams A3, B3. Upon reflecting from GTE 140 and double passing through quarter-wave plate 130, the polarization plane of beams A2, B2 is once again rotated. Thus, when the beams A3, B3 re-intersect at PBS 110, they are recombined into an unpolarized beam and directed to mirror 150. This completes the third cycle.

Mirror 150 redirects the unpolarized beam toward PBS 110, beginning a fourth and final cycle in which GTE 140 contributes a fourth unit of group delay on polarized beams A4, B4. Upon reflecting from GTE 140 and double passing through quarter-wave plate 130, the polarization plane of beams A4, B4 is once again rotated. Thus, when the beams A4, B4 re-intersect at PBS 110, they are recombined into an unpolarized output optical beam 190, which exits compensator 10.

All told, compensator 10 contributes four units of group delay over four cycles. That is, four interactions with GTE 140 are made by the constituent components of input optical beam 100, all at normal incidence. In general, any number of such interactions can be designed into this geometry.

Figure 2:
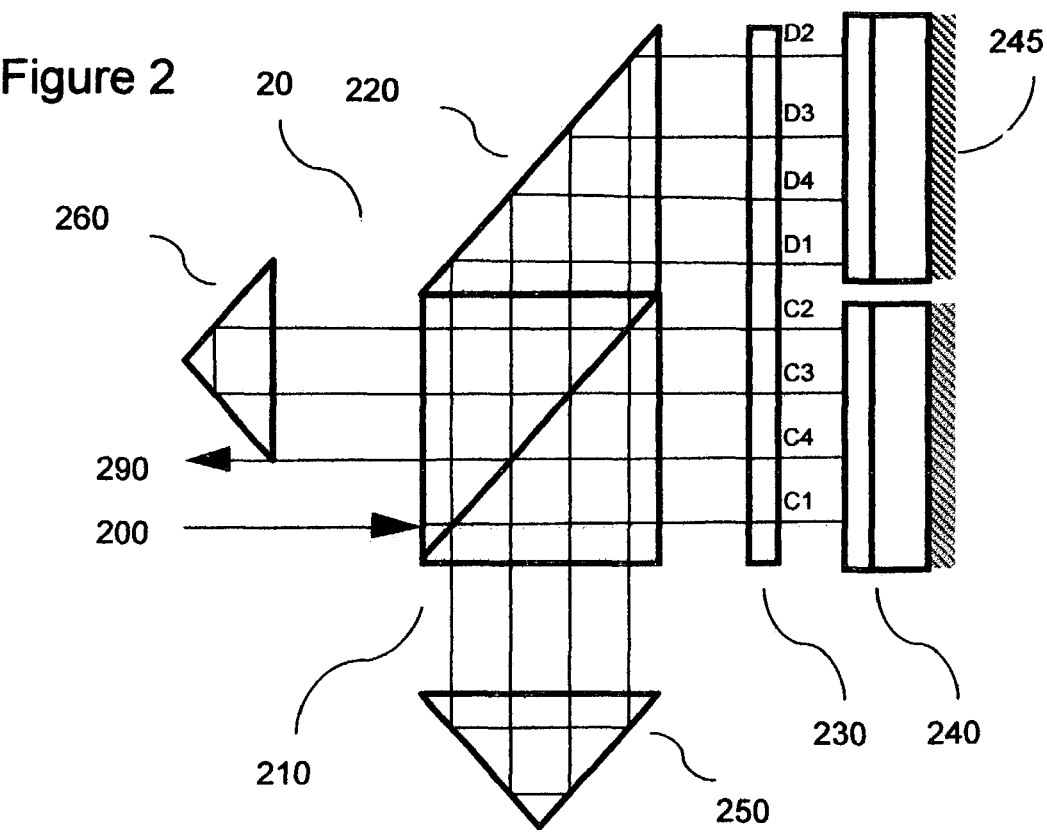
FIG. 2 shows a chromatic dispersion compensator having one PBS, one quarter-wave plate, two GTEs and three ninety degree mirrors, in accordance with a second embodiment of the invention.

In FIG. 2, a chromatic dispersion compensator 20 in accordance with a second embodiment of the invention is shown. Compensator 20 includes a PBS 210, a first ninety degree mirror 220, a quarter-wave plate 230, a first GTE 240, a second GTE 245, a second ninety degree mirror 250 and a third ninety degree mirror 260. Elements 210, 220, 230, 250 and 260 are similar in composition and operation to their counterparts 110, 120, 130, 250 and 260 in FIG. 1. However, use of two GTEs 240, 245 having different resonant properties allows for polarization mode dispersion (PMD) in which the group delays induced on the beams may be made polarization-dependent. Use of two GTEs 240, 245 also permits adjustments to ensure normal incidence of beams into GTEs 240, 245, even if one or more of prismatic mirrors 220, 250, 260 are imperfect. Finally, use of two GTEs 240, 245 enables CD correction of pulses transmitted on broader channels.

In operation, an input optical beam 200, which is unpolarized, is incident into PBS 210. PBS 210 splits beam 200 into two polarized beams C1, D1. Polarized beams C1, D1 are directed (with the help of mirror 220 in the case of D1) toward GTEs 240, 245, respectively, at normal incidence via quarter-wave plate 230. GTEs 240, 245 contribute a first unit of group delay to polarized beams C1, D1, respectively. Recall that the group delay induced by GTE 240 may have different wavelength-dependence than the group delay induced by GTE 245 owing to configurably different resonant properties of GTEs 240, 245. Upon reflecting from GTEs 240, 245, respectively, and again passing through quarter-wave plate 230, the polarization plane of beams C1, D1 is rotated. Thus, when beams C1, D1 re-intersect at PBS 210, they are recombined into an unpolarized beam and directed to mirror 250. This completes the first cycle.

Mirror 250 redirects the unpolarized beam toward PBS 210, beginning the second cycle in which GTEs 240, 245 contribute a second unit of group delay on polarized beams C2, D2, respectively. All told, compensator 20 contributes four units of group delay over four cycles. That is, four interactions with GTEs 240, 245 are made by the constituent components of input optical beam 200 before an unpolarized output optical beam 290 exits compensator 20. Moreover, the constituent portion of input optical beam 200 which had a first polarization is subjected to four interactions with GTE 240, while the constituent portion of inbound beam 200 which had a second polarization is subjected to four bounces off GTE 245, enabling PMD if desired by configuring GTE 240 and GTE 245 with different resonant properties. In general, any number of such interactions can be designed into this geometry.

Figure 3:
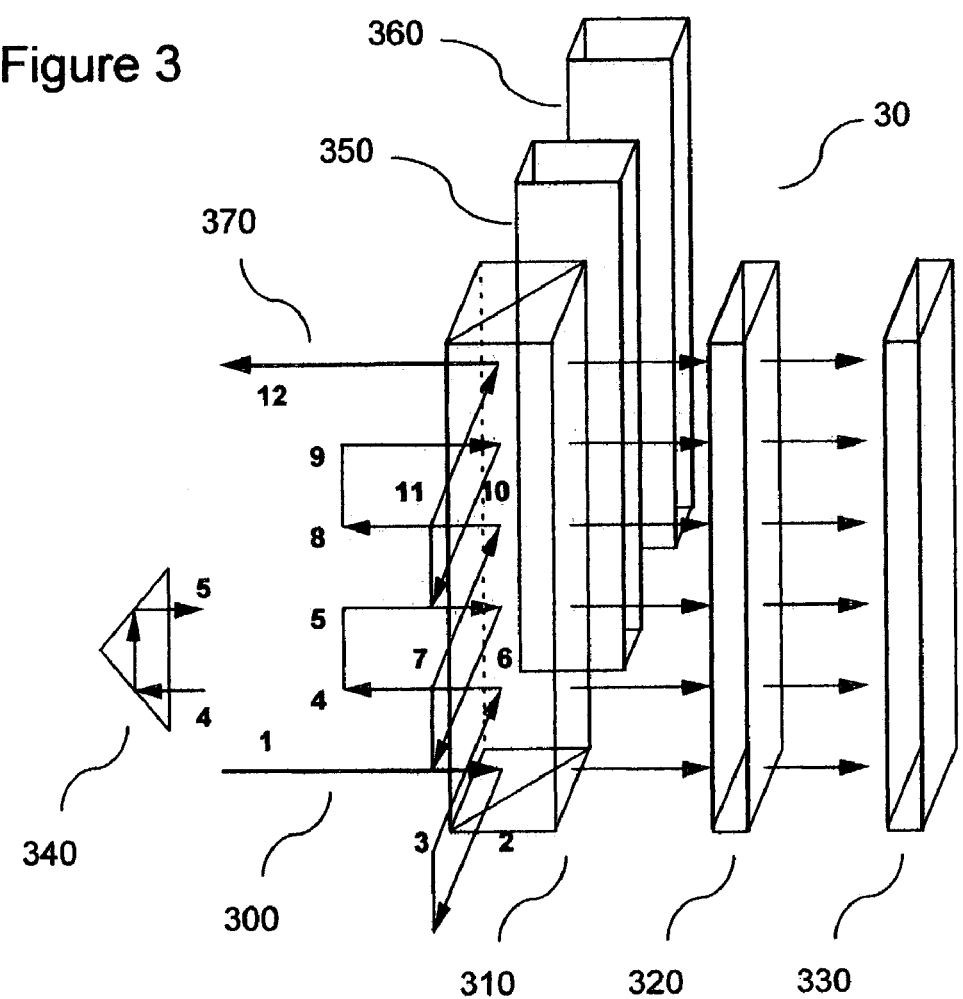
FIG. 3 shows a chromatic dispersion compensator having one PBS, two quarter-wave plates, two GTEs and a plurality of elevator prisms, in accordance with a third embodiment of the invention.

In FIG. 3, a chromatic dispersion compensator 30 in accordance with a third embodiment of the invention is shown. Compensator 30 has a PBS 310, two quarter-wave plates 320, 350, two GTEs 330, 360 and multiple elevator prisms 340. The principle of operation is generally the same as in FIGS. 1 and 2 except in compensator 30 the beam migrates from ground level to higher levels with the assistance of elevator prisms 340. Elevator prisms 340 are right angle glass prisms whose shortest two legs are fully reflective and which are disposed to cause an input optical beam to project onto a higher plane upon reflection.

In operation, an input optical beam 300, which is unpolarized, is incident into PBS 310 (identified as beam stage 1 in FIG. 3). PBS 310 splits beam 300 into two polarized beams. The two polarized beams are directed toward GTEs 330, 360, respectively, at normal incidence via quarter-wave plates 320, 350, respectively. GTEs 330, 360 contribute a first unit of group delay on the polarized beams, respectively. Upon reflecting from GTEs 330, 360 and passing through quarter-wave plates 320, 350 a second time on the return trip, the polarization plane of the beams is rotated. Thus, when the beams re-intersect at PBS 310, they are recombined into an unpolarized beam and directed to an elevator prism (beam stage 2 in FIG. 3). This elevator prism has been omitted from FIG. 3 for clarity. This completes the first cycle.

The elevator prism elevates and redirects, the unpolarized beam toward PBS 310 (beam stage 3 in FIG. 3), beginning a second cycle in which GTEs 330, 360 contribute a second unit of group delay on the respective polarized beams, Upon reflecting from GTEs 330, 360 and completing another double-pass through quarter-wave plates 320, 350, the beams re-intersect at PBS 310 and are recombined into an unpolarized beam and directed to elevator prism 340 (beam stage 4 in FIG. 3). This completes the second cycle.

All told, the beam completes beam stages 5, 6, 7, . . . 11 in which compensator 30 contributes six units of group delay on the polarized beams, respectively, over six cycles. That is, six interactions with GTEs 330, 360 are made by the constituent components of input optical beam 300, all at normal incidence, before output optical beam 370, which is unpolarized, exits compensator 30 (beam stage 12 in FIG. 3).

Figure 4:
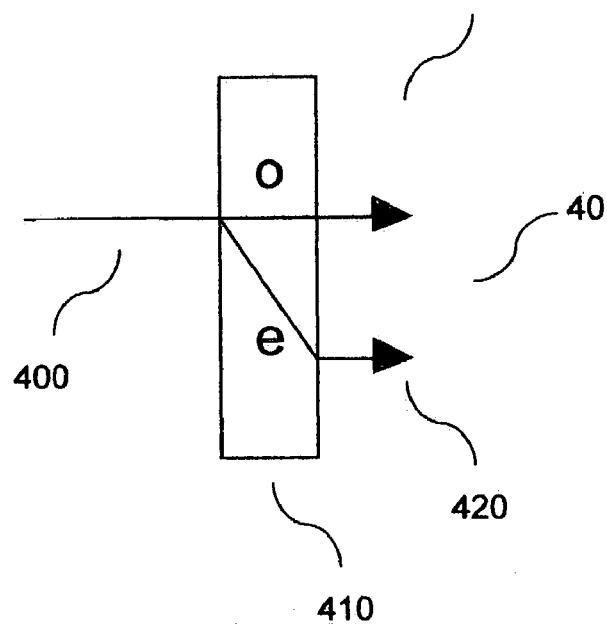
FIG. 4 shows a crystal polarizer.

In FIG. 4, a crystal polarizer 40 is shown. Crystal polarizer 40 includes a birefringent crystal 410 which is reactive to the polarization of light to create spatial separation, without altering direction. That is, light is either transmitted on the plane of entry or "walks over" and is transmitted on a different plane depending on its polarization. In the case of FIG. 4, ordinary beam "o" having a first polarization is transmitted as output optical beam 430 on the plane of entry while extraordinary beam "e" having a second polarization walks over and is transmitted as output optical beam 420 on a lower plane than the plane of entry. Both output optical beams 420, 430 continue in the direction of entry.

Figure 5:
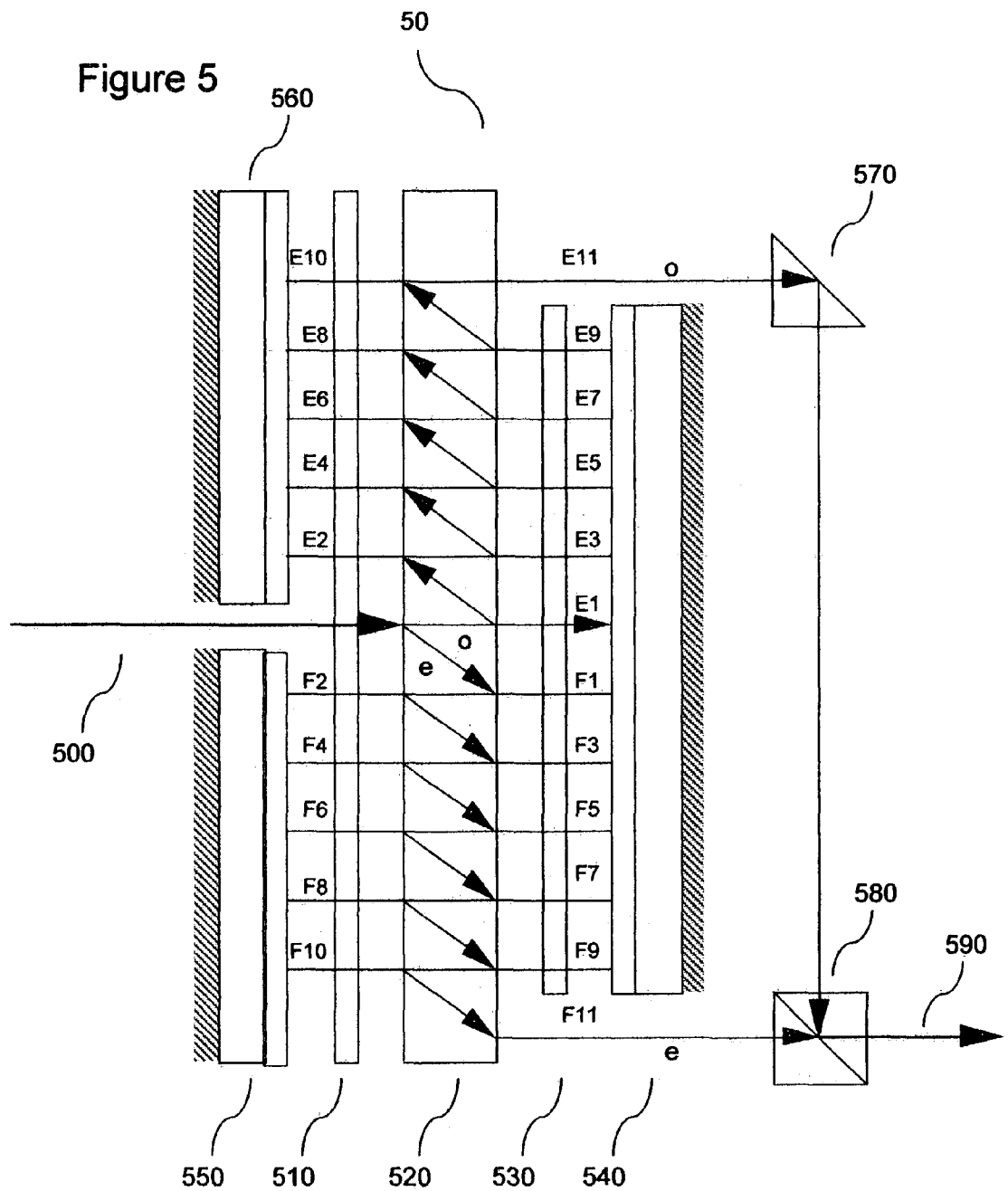
FIG. 5 shows a chromatic dispersion compensator having one crystal polarizer, two quarter-wave plates, three GTEs, one ninety degree mirror and one PBS, in accordance with a fourth embodiment of the invention.

In FIG. 5, a chromatic dispersion compensator 50 in accordance with a fourth embodiment of the invention is shown. Compensator 50 has a crystal polarizer 520, two quarter-wave plates 510, 530, three GTEs 540, 550, 560, a ninety degree mirror 570 and a PBS 580.

In operation, an input optical beam 500, which is unpolarized, is incident into crystal polarizer 520. Crystal polarizer 520 splits beam 500 into two polarized beams E1 (ordinary beam "o") and F1 (extraordinary beam "e") in the general manner discussed above in connection with FIG. 4. That is, E1 is transmitted on the plane of entry while F1 walks down and is transmitted on a lower plane than the plane of entry. Polarized beams E1, F1 are directed toward GTE 540 at normal incidence via quarter-wave plate 530. GTE 540 contributes a first unit of group delay on polarized beams E1, F1. Upon reflecting from GTE 540 and passing through quarter-wave plate 530 a second time on the return trip, the polarization plane of beams E1, F1 is rotated. This completes the first cycle.

When beams E1, F1 reenter crystal polarizer 520 (transitioning to beams E2, F2, respectively), E2 walks up for transmission on a higher plane than the plane of entry while F2 is transmitted on the plane of entry. Polarized beams E2, F2 are directed toward GTEs 560, 550, respectively, at normal incidence via quarter wave plate 510. GTEs 560, 550 contribute a second unit of group delay to polarized beams E2, F2, respectively. Upon reflecting from GTEs 560, 550 and passing through quarter-wave plate 510 a second time on the return trip, the polarization plane of beams E2, F2 is rotated. This completes the second cycle.

In similar fashion, compensator 50 contributes eight additional units of group delay on polarized beams E3 . . . E10, F3 . . . F10, respectively, over eight additional cycles. In all, a total of ten bounces off GTEs 540, 550, 560 are made on the constituent portions of input optical beam 500, all at normal incidence. Then, polarized beams E11 and F11 are directed to PBS 580 (with the help of mirror 570 in the case of beam E11). At PBS 580, beams E11, F11 re-intersect and are recombined into output optical beam 590 which is unpolarized and which exits compensator 50.

Figure 6:
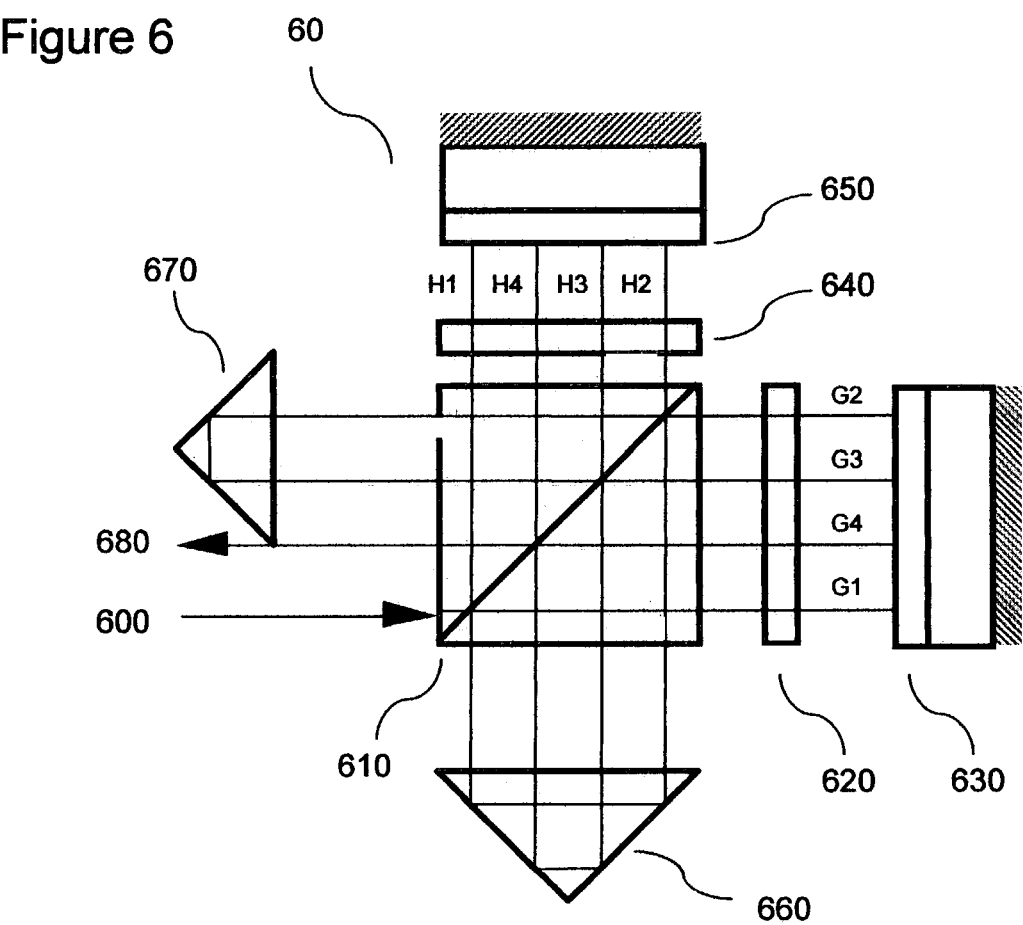
FIG. 6 shows a chromatic dispersion compensator having one PBS, two quarter-wave plates, two GTEs and two ninety degree mirrors, in accordance with a fifth embodiment of the invention.

In FIG. 6, a chromatic dispersion compensator 60 in accordance with a fifth embodiment of the invention is shown. Compensator 60 has a PBS 610, two quarter-wave plates 620, 640, two GTEs 630, 650 and two ninety degree mirrors 660, 670.

In operation, an input optical beam 600, which is unpolarized, is incident into PBS 610. PBS 610 splits beam 600 into two polarized beams G1, H1. Polarized beams G1, H1 are directed toward GTEs 630, 650, respectively, at normal incidence via quarter-wave plates 620, 640, respectively. GTEs 630, 650 contribute a first unit of group delay on polarized beams G1, H1. Upon reflecting from GTEs 630, 650 and passing through quarter-wave plates 620, 640 a second time on the return trip, the polarization plane of beams G1, H1 is rotated. Thus, when the beams G1, H1 re-intersect at PBS 610, they are recombined into an unpolarized beam and directed to mirror 660. This completes the first cycle.

Mirror 660 redirects the unpolarized beam toward PBS 610, beginning a second cycle in which GTEs 630, 650 contribute a second unit of group delay on polarized beams G2, H2, respectively. All told, compensator 60 contributes four units of group delay over four cycles. That is, four bounces off GTEs 630, 650 are made by the constituent components of input optical beam 600, all at normal incidence, before output optical beam 680, which is unpolarized, exits compensator 60.

It will be appreciated by those of ordinary skill in the art that the invention can be embodied in other specific forms without departing from the spirit or essential character hereof. The present invention is therefore considered in all respects to be illustrative and not restrictive. The scope of the invention is indicated by the appended claims, and all changes that come within the meaning and range of equivalents thereof are intended to be embraced therein.

We claim:

1. A chromatic dispersion compensator, comprising:
   a polarization changer;
   a beam delay element; and
   a beam director,
   wherein the polarization changer receives an optical beam having a unit of group delay induced thereon by the beam delay element and induces a change in polarization of the optical beam prior to transmitting the optical beam to the beam director, the change in polarization inducing a path change on the optical beam by the beam director whereupon the optical beam is redirected to the beam delay element whereat a further unit of group delay is induced on the optical beam,
   wherein the beam director is a single polarizing beam splitter that is operatively coupled with a plurality of ninety degree mirrors to facilitate inducement of at least four units of group delay on the optical beam.

2. The compensator of claim 1, wherein the optical beam is a portion of an input optical beam and wherein the compensator induces multiple units of group delay on other portions of the input optical beam and re-combines the optical beam with the other portions into an output optical beam.

3. The compensator of claim 1, wherein the beam delay element comprises a Gires-Tournois etalon.

4. The compensator of claim 1, wherein the beam delay element comprises a plurality of Gires-Tournois etalons.

5. The compensator of claim 1, wherein the polarization changer comprises a quarter-wave plate.

6. The compensator of claim 1, wherein the incidence of the optical beam into the beam delay element is substantially normal.

7. A method for chromatic dispersion compensation, comprising the steps of:
   directing an optical beam to a delay element;
   inducing a unit of group delay on the optical beam at the delay element;
   changing a polarization of the optical beam;
   inducing a path change on the optical beam based on the changed polarization;
   redirecting the optical beam to the delay element; and
   inducing a further unit of group delay on the optical beam at the delay element,
   wherein a single polarizing beam splitter is operatively coupled with a plurality of ninety degree mirrors to facilitate inducement of at least four units of group delay on the optical beam.

8. The method of claim 7, further comprising the step of re-combining the optical beam with other portions of an input optical beam upon which multiple units of group delay have been induced.

9. The method of claim 7, wherein the beam delay element comprises a Gires-Tournois etalon.

10. The method of claim 7, wherein the beam delay element comprises a plurality of Gires-Tournois etalons.

11. The method of claim 7, wherein the changing step is performed by a quarter-wave plate.

12. The method of claim 7, wherein the incidence of the optical beam into the beam delay element is substantially normal.

* * * * *